Nov. 11, 1969    G. SCHULZE ET AL    3,477,828
HIGH PRESSURE SYNTHESIS REACTOR FOR EXOTHERMIC GAS REACTIONS
Filed June 22, 1966    3 Sheets-Sheet 1

INVENTORS:
GUENTHER SCHULZE
KARL-HEINZ HECK
BY
Marzall, Johnston, Cook & Roo
ATT'YS

Nov. 11, 1969 G. SCHULZE ET AL 3,477,828

HIGH PRESSURE SYNTHESIS REACTOR FOR EXOTHERMIC GAS REACTIONS

Filed June 22, 1966 3 Sheets-Sheet 3

INVENTORS:
GUENTHER SCHULZE
KARL-HEINZ HECK
BY
Marzall, Johnston, Cook, Root
ATT'YS United States Patent Office 3,477,828
Patented Nov. 11, 1969

3,477,828
HIGH PRESSURE SYNTHESIS REACTOR FOR EXOTHERMIC GAS REACTIONS
Guenther Schulze and Karl-Heinz Heck, Ludwigshafen (Rhine), Germany, assignors to Badische Anilin- & Soda-Fabrik Aktiengesellschaft, Ludwigshafen (Rhine), Germany
Filed June 22, 1966, Ser. No. 559,526
Claims priority, application Germany, June 24, 1965, 1,442,594
Int. Cl. B01j 9/04
U.S. Cl. 23—289                              3 Claims

ABSTRACT OF THE DISCLOSURE

High pressure synthesis reactor embodying an elongated reactor tube surrounded by a double-walled jacket tube. The catalyst is supported in the reactor tube at longitudinally spaced intervals. The jacket tube is movable relative to the reactor tube in the longitudinal direction to compensate for thermal expansion and contraction. The jacket tube has longitudinal gas flow passages. The gas inlets to the reactor tube are sealed by annular stuffing box means comprising ring-shaped packings.

---

Figure 1:
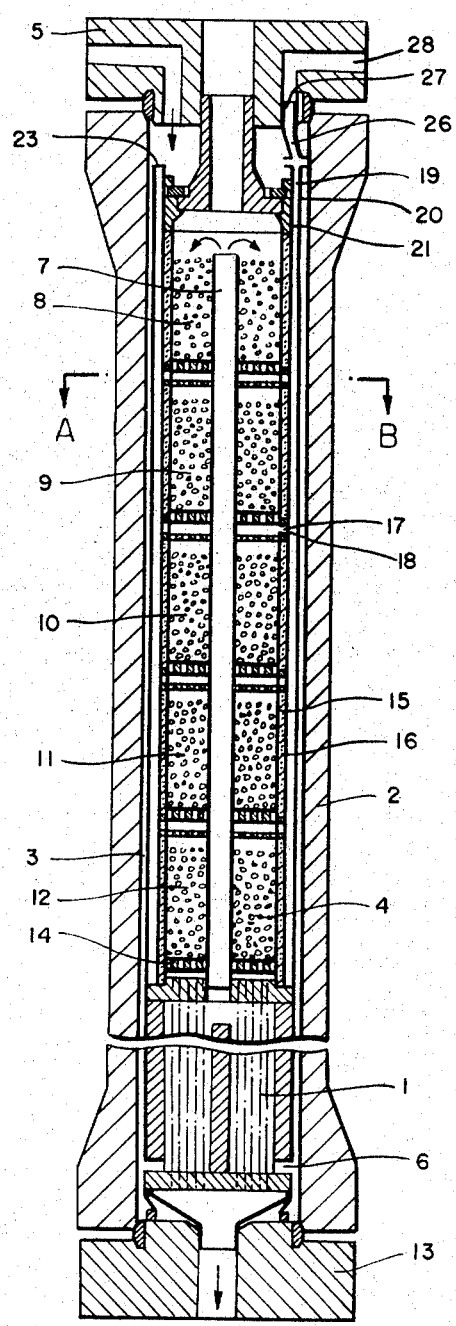

The present invention relates to a high pressure synthesis reactor for exothermic gas reactions.

In many exothermic gas reactions which are carried out in high-pressure synthesis reactors, for example in ammonia synthesis, methanol synthesis and the catalytic hydrogenation of unsaturated compounds, e.g. unsaturated hydrocarbons, it is necessary to carry away the heat of reaction from the synthesis reactor. In the prior art reactor designs, the heat of reaction is carried off in various ways:

(a) by heat exchange elements located in the layer of catalyst, gases being used as the coolant;

(b) in reactors containing a plurality of layers of catalyst, by providing heat exchange elements between the individual layers, water being used for example as the coolant; and (c) by direct cooling by mixing cold gas with the synthesis gas after each individual layer of catalyst so that the temperature of the whole of the gas stream is lowered in the desired way.

Reactors of the last-mentioned design are known as multilayer reactors. The cold gas may be introduced into these reactors in various ways. Reactors are known in which the cold gas feed lines are laid as separate pipes outside the catalyst vessel on the wall up to the point of introduction behind the individual catalyst layers. In other reactors the supply lines for the cold gas are inside the catalyst chamber and are passed directly through the catalyst layer to the various points of introduction. In view of the increase in the capacities of synthesis reactors, resulting from the improved activity of the catalysts, and the consequent formation of a larger amount of heat of reaction, the amount of cold gas required for cooling must of necessity also be increased. Therefore it is often difficult to supply an amount of cold gas which is adequate for cooling to the various points of introduction through the cold gas supply lines owing to the relatively narrow pipe cross-section dictated by the design. In addition to this limitation on the amount of cold gas by the cross-section of the pipes, there are further difficulties arising from the fact that the cold gas pipes cannot be adequately insulated from the hot catalyst bed owing to lack of space so that the cold gas is heated up in an undesirable way and the distribution of temperature in the individual layers of catalyst is deleteriously affected by uneven withdrawal of heat. Another point is that owing to the considerable difference in temperature, the walls of the catalyst vessel and the cold gas supply pipes expand to different extents so that the connections between the cold gas pipes and the catalyst vessel often become detached.

It is an object of the present invention to provide a high-pressure synthesis reactor which does not have the above-mentioned disadvantages. This object is achieved in high pressure synthesis reactors having a plurality of layers of catalyst disposed in a vessel between which cold gas is mixed with the synthesis gas, when the cold gas is supplied to the respective mixing points between the layers of catalyst through a double-walled jacket tube arranged concentrically about the catalyst vessel, said jacket being subdivided into longitudinal flow passages, being freely extendable relatively to the catalyst vessel in the longitudinal direction and being rigidly secured to the catalyst vessel at its lower end, said double jacket tube and the catalyst vessel being connected at the gas inlet points by an annular inlet chamber which is sealed at the top and bottom by stuffing boxes which are secured to the catalyst vessel and slide on the double-walled jacket tube.

Figure 2:
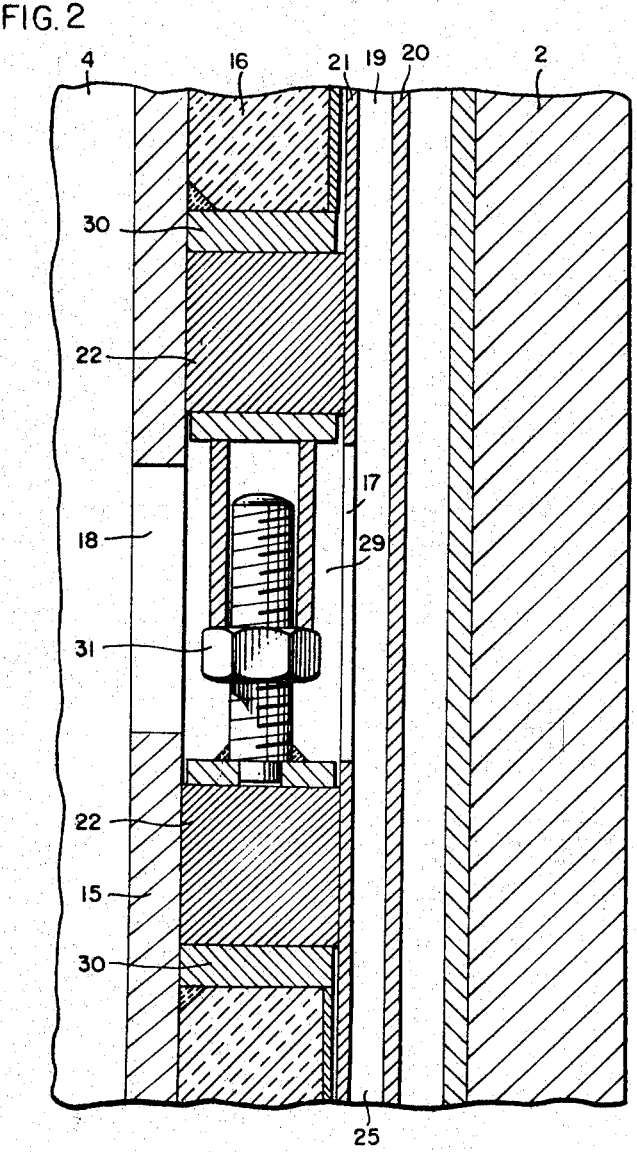
Figure 3:
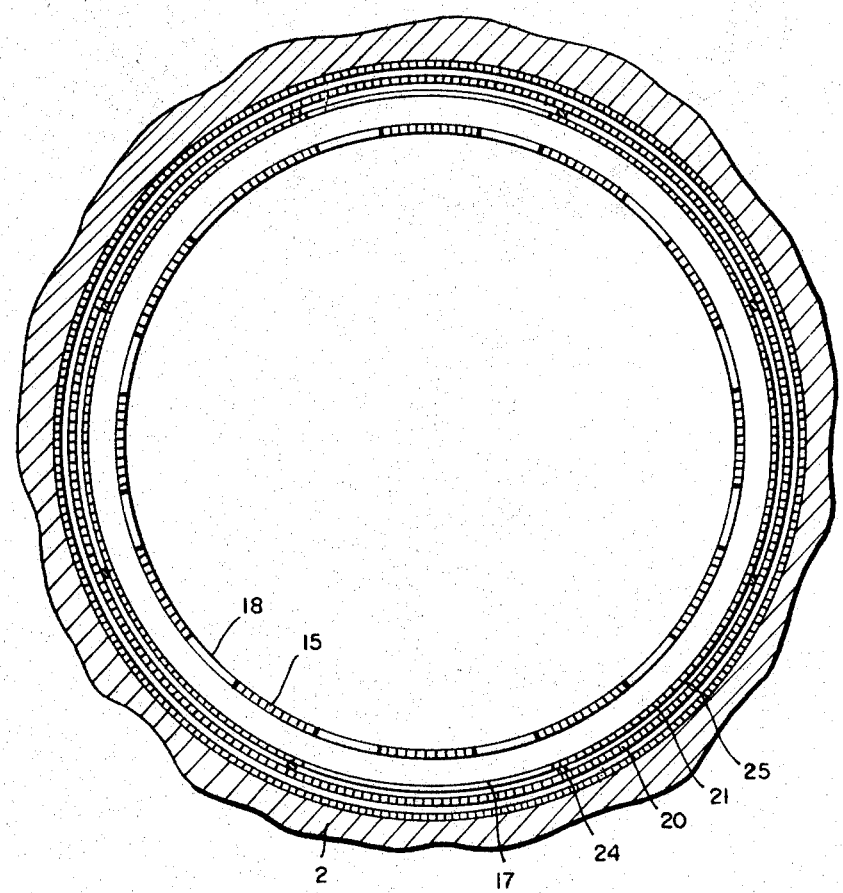

The invention will now be described with reference to the accompanying drawings which shown diagrammatically an embodiment of the high pressure synthesis reactor in accordance with the invention by way of example. FIGURE 1 is a longitudinal section through the reactor, FIGURE 2 is a longitudinal section of a portion of the reactor in the vicinity of the line A–B in FIGURE 1 on an enlarged scale, and FIGURE 3 is a section on the line A–B in FIGURE 1.

The drawings show a synthesis reactor such as is conventionally used for ammonia synthesis and which comprises a plurality of layers of catalyst 8, 9, 10, 11 and 12 and a heat exchanger 1 arranged in a high-pressure jacket 2. Synthesis gas enters the reactor through the upper cover 5 into the space 3 between the inner wall of the jacket 2 and the catalyst vessel 4 and flows downwards to the inlet openings 6 arranged at the lower end of the heat exchanger 1. The gas flows upwards outside the tubes of the heat exchanger and collects in a central tube 7 in which an electric heating element (not shown) is arranged. At the upper end of this tube 7, the gas changes direction and enters catalyst layer 8 which is located within catalyst vessel 4. The individual layers of catalyst are bounded at the bottom by grates 14. The gas passes in series through the catalyst layers 9, 10, 11 and 12 and then through the inside of the tubes in the heat exchanger 1 giving up its sensible heat to the freshly entering synthesis gas. The synthesis gase leaves the reactor through the lower cover 13.

Cold gas required for cooling the synthesis gas is supplied through passages 28 provided in the cover 5. The cold gas is supplied to the individual layers of catalyst through a double-walled jacket tube 19 which is subdivided into segments and which is described in greater detail below. The double-walled jacket tube 19, formed by tubes 20 and 21 (see particularly FIGURE 2), is connected with the passages 28 by tubes 26. To permit free expansion of the double-walled jacket tube, a compensator or stuffing box is provided between each tube 26 and the appropriate passage 28. The top of the double-walled jacket tube 19 is provided with a closure 23 which is only interrupted by the tubes 26. Cold gas passes from the double-walled jacket tube 19 into the reactor through slots 17 and openings 18 in the catalyst vessel. The double-walled jacket tube 19 is also closed at the bottom and rigidly secured externally to the catalyst vessel. There is no other fixed connection between the double-walled jacket tube and the catalyst vessel. Allowance is thus made for the different thermal expansion of the catalyst vessel and the double-walled jacket tube, and free expansion of the vessel relatively to the double-walled jacket tube is ensured.

In the embodiment of synthesis reactor according to this invention, the catalyst vessel 4 (as more clearly shown in FIGURE 2) is capable of upward expansion independently of the double-walled jacket tube 19. The wall 15 of the catalyst vessel 4 has outside it a continuous thermal insulation 16 which is interrupted by the slots 17 through which cold gas is introduced into the catalyst vessel beneath the layer of catalyst. The wall 15 is provided with openings 18 in the region of these slots 17. Cold gas passes through the openings 18 into the interior of the catalyst vessel 4. At the periphery of the catalyst vessel 4, an annular cold gas inlet chamber 29 is formed within the layer of insulation 16 at the inlet points 18. This inlet chamber is bounded by base rings 30 which are rigidly secured to the wall of the catalyst vessel but have no fixed connection with the double-walled jacket tube 19. The seal is made by stuffing box packings 22 provided above and below the outlet openings 17 and being in sliding contact with the double-walled jacket tube 19 and rigidly secured to the wall 15 of the catalyst vessel 4. The height of the annular cold gas inlet chamber 29 should be chosen so that with maximum expansion of the catalyst vessel 4 with respect to the double-walled jacket tube 19, the openings in the latter are not covered by the stuffing box packing 22, which is adjusted by means of a screw 31.

The double-walled jacket tube 19, as shown in FIGURE 3, is subdivided by longitudinal partitions 24 into a number of segments corresponding to the number of supply points. For the synthesis reactor shown, it is sufficient for the double-walled jacket tube to be subdivided into four segments. Since however the supply passages 25 formed by the partitions 24 should have different lengths owing to the positions of the cold gas inlet points being at different levels, the double-walled jacket tube 19 in contact with the cold gas is subjected to varying stress by reason of differing thermal action, so that it could be distorted. It is therefore advantageous to subdivide the double-walled jacket tube, for each cold gas inlet point, into more than one segment, for example into two, three or four segments distributed symmetrically. In the present case the double-walled jacket tube is subdivided into two segments for each cold gas inlet point. At the same level as the annular cold gas inlet chamber 29, openings 17 are provided in the appropriate cold gas supply passages 25 which permit the flow of cold gas out from the double-walled jacket tube into the cold gas inlet chambers 29 and thus into the interior of the catalyst vessel 4.

We claim:
1. A high pressure synthesis reactor for exothermic gas reactions in which a plurality of separated layers of catalyst are provided in a vessel and in which means are provided for mixing cold gas with the synthesis gas between said layers, which reactor comprises an elongated reactor tube surrounded by a double-walled jacket tube with an annular space therebetween, means located at longitudinally spaced intervals in said reactor tube for supporting said catalyst layers, means longitudinally subdividing said jacket tube into longitudinal flow passages, means rigidly attaching said jacket tube to said reactor tube at the lower end only whereby the remainder of said jacket tube is movable relative to said reactor tube in the longitudinal direction, and passage means defining cool gas ports for flow of gas from said jacket tube into said reactor tube, said passage means including annular stuffing box means in said annular space and sealing off said space on opposite sides of said passage means, and means attaching said stuffing box means only to said reactor tube or to said jacket tube, whereby said jacket tube may expand and contract longitudinally and independently of said reactor tube.

2. A reactor as claimed in claim 1 wherein said stuffing box means comprises rings in said annular space respectively rigidly attached to and extending from the outer side of said reactor tube on opposite sides of said passage means, a ring-shaped packing in said annular space between said reactor tube and said jacket tube on each side of said passage means and adjustable, pressure means extending between said packings and pressing said packings against respective rings to thereby seal the space between said jacket tube and said reactor tube on opposite sides of said passage means.

3. A reactor as claimed in claim 2 wherein said adjustable, pressure means embodies screw-threaded members extending between respective packings.

References Cited

UNITED STATES PATENTS

| 1,689,684 | 10/1928 | Reed | 23—289 |
| 1,848,466 | 3/1932 | Edmonds | 23—289 |
| 1,960,386 | 5/1934 | Lopez | 23—289 |
| 2,887,365 | 5/1959 | De Rycker et al. | 23—289 X |

FOREIGN PATENTS

| 964,042 | 5/1957 | Germany. |

JOSEPH SCOVRONEK, Primary Examiner